United States Patent
Tsujimoto

(10) Patent No.: US 12,422,856 B2
(45) Date of Patent: Sep. 23, 2025

(54) ATTITUDE CONTROL DEVICE

(71) Applicant: HONDA MOTOR CO., LTD., Tokyo (JP)

(72) Inventor: Ryota Tsujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 18/171,963

(22) Filed: Feb. 21, 2023

(65) Prior Publication Data

US 2023/0266774 A1    Aug. 24, 2023

(30) Foreign Application Priority Data

Feb. 22, 2022 (JP) ................... 2022-025398

(51) Int. Cl.
*G05D 1/00* (2024.01)
*B64C 29/00* (2006.01)

(52) U.S. Cl.
CPC .......... *G05D 1/102* (2013.01); *B64C 29/0008* (2013.01)

(58) Field of Classification Search
CPC .. G05D 1/102; G05D 1/0858; B64C 29/0008; B64C 27/0858
USPC .......................................................... 701/8
See application file for complete search history.

(56) References Cited

U.S. PATENT DOCUMENTS

| | | |
|---|---|---|
| 10,160,534 B2 | 12/2018 | Wong et al. |
| 11,485,488 B1 * | 11/2022 | Armer ............... B64C 29/0033 |
| 2017/0300066 A1 * | 10/2017 | Douglas ............... G05D 1/0858 |
| 2021/0245873 A1 * | 8/2021 | Tighe ...................... B60L 50/50 |
| 2021/0291976 A1 * | 9/2021 | Eglin ....................... B64C 27/22 |
| 2022/0043465 A1 * | 2/2022 | Vander Mey ............ G05D 1/46 |
| 2022/0144417 A1 * | 5/2022 | Ross ...................... B64C 27/06 |
| 2022/0171409 A1 * | 6/2022 | Ouellet ............... B64C 29/0033 |

* cited by examiner

*Primary Examiner* — Tiffany P Young
*Assistant Examiner* — John D Holman
(74) *Attorney, Agent, or Firm* — Rankin, Hill & Clark LLP

(57) ABSTRACT

A rotor control device a vertical rotor control unit, a horizontal rotor control unit, and an allocation command value calculation unit. The vertical rotor control unit controls each VTOL rotor based on a first allocation command value. The horizontal rotor control unit controls each cruise rotor based on a second allocation command value. The allocation command value calculation unit sets, as the first allocation command value, a difference between a command value of a yaw moment and the second allocation command value, sets the magnitude of the second allocation command value to 0 when the command value of the yaw moment is less than a threshold, and sets the magnitude of the second allocation command value to a value greater than 0 when the command value of the yaw moment is equal to or greater than the threshold.

8 Claims, 6 Drawing Sheets

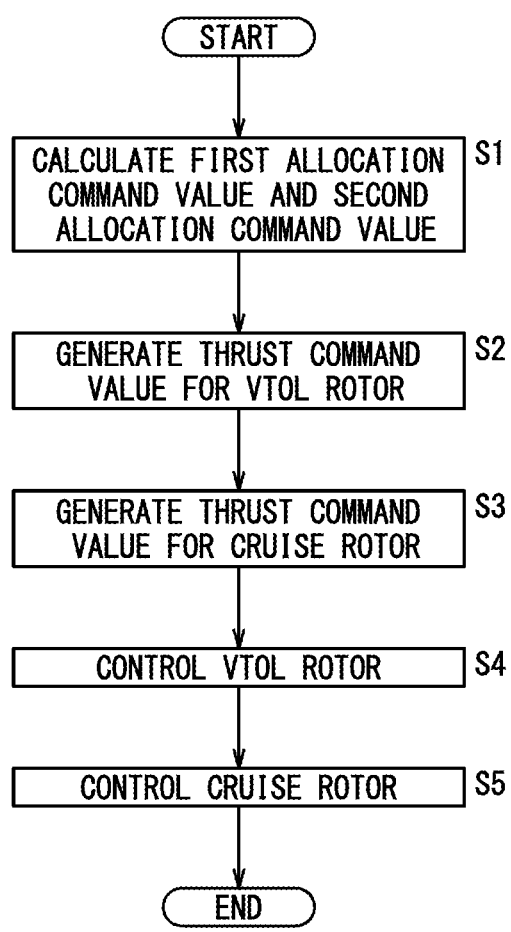

ATTITUDE CONTROL DEVICE

CROSS-REFERENCE TO RELATED APPLICATIONS

This application is based upon and claims the benefit of priority from Japanese Patent Application No. 2022-025398 filed on Feb. 22, 2022, the contents of which are incorporated herein by reference.

BACKGROUND OF THE INVENTION

Field of the Invention

The present invention relates to an attitude control device, and a control method for the attitude control device.

Description of the Related Art

US 2021/0245873 A1 discloses a VTOL aircraft. The VTOL aircraft rotates in the yaw direction by creating a difference between the rotational speed of the vertical rotors rotating in the first direction and the rotational speed of the vertical rotors rotating in the second direction.

SUMMARY OF THE INVENTION

In the technique disclosed in US 2021/0245873 A1, there is a problem in that, when the required yaw moment is excessive, a sufficiently large yaw moment cannot be generated by the vertical rotors and the attitude of the fuselage cannot be stabilized.

An object of the present invention is to solve the above-mentioned problem.

According to a first aspect of the present invention, there is provided an attitude control device that performs attitude control of a fuselage of an aircraft including a plurality of vertical rotors each configured to generate thrust in a vertical direction and a plurality of horizontal rotors each configured to generate thrust in a horizontal direction, the attitude control device comprising: a yaw moment command value calculation unit configured to calculate a command value of a yaw moment to be applied to the fuselage; an allocation command value calculation unit configured to calculate a first allocation command value and a second allocation command value in accordance with the command value of the yaw moment; a vertical rotor control unit configured to control each of the vertical rotors based on the first allocation command value; and a horizontal rotor control unit configured to control each of the horizontal rotors based on the second allocation command value, wherein the allocation command value calculation unit: sets, as the first allocation command value, a difference between the command value of the yaw moment and the second allocation command value; sets a magnitude of the second allocation command value to 0 when the command value of the yaw moment is less than a threshold; and sets the magnitude of the second allocation command value to a value greater than 0 when the command value of the yaw moment is equal to or greater than the threshold.

According to a second aspect of the present invention, there is provided a control method for an attitude control device that performs attitude control of a fuselage of an aircraft including a plurality of vertical rotors each configured to generate thrust in a vertical direction and a plurality of horizontal rotors each configured to generate thrust in a horizontal direction, the control method comprising: calculating a command value of a yaw moment to be applied to the fuselage; setting, as a first allocation command value, a difference between the command value of the yaw moment and a second allocation command value; setting a magnitude of the second allocation command value to 0 when the command value of the yaw moment is less than a threshold; setting the magnitude of the second allocation command value to a value greater than 0 when the command value of the yaw moment is equal to or larger than the threshold; controlling each of the vertical rotors based on the first allocation command value; and controlling each of the horizontal rotors based on the second allocation command value.

According to the present invention, it is possible to stabilize the attitude of the fuselage.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a flowchart showing a flow of a rotor control process performed by the rotor control device.

DETAILED DESCRIPTION OF THE INVENTION

First Embodiment

[Configuration of Aircraft]

Figure 1:
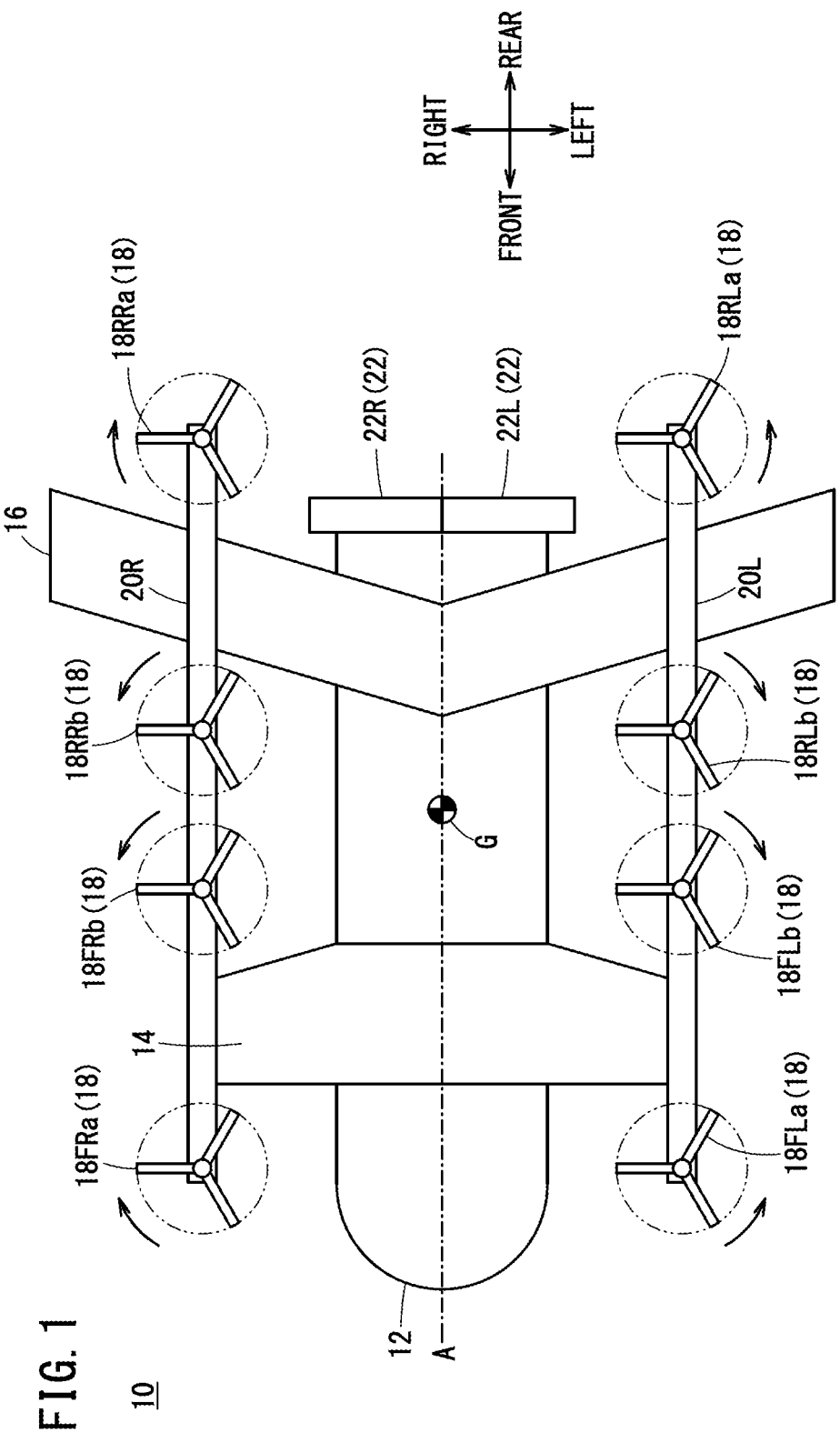
FIG. 1 is a schematic view of an aircraft.

FIG. 1 is a schematic diagram of an aircraft 10. The aircraft 10 of the present embodiment is an electric vertical take-off and landing aircraft (eVTOL aircraft). In the aircraft 10 of the present embodiment, rotors are driven by electric motors. The aircraft 10 of the present embodiment generates vertical thrust and horizontal thrust by the rotors. The aircraft 10 of the present embodiment is a hybrid aircraft. The aircraft 10 of the present embodiment includes a generator and a battery as power sources of the electric motor.

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled without the pilot riding therein.

The aircraft 10 includes a front wing 14 and a rear wing 16. The front wing 14 is attached forward of a center of gravity G of the fuselage 12. The rear wing 16 is attached rearward of the center of gravity G of the fuselage 12. When the aircraft 10 moves forward, lift is generated in each of the front wing 14 and the rear wing 16.

The aircraft 10 includes eight VTOL rotors 18. The eight VTOL rotors 18 are a rotor 18FLa, a rotor 18FLb, a rotor 18RLa, a rotor 18RLb, a rotor 18FRa, a rotor 18FRb, a rotor 18RRa, and a rotor 18RRb. Each VTOL rotor 18 corresponds to a vertical rotor of the present invention.

The rotor 18FLa, the rotor 18FLb, the rotor 18RLa, and the rotor 18RLb are attached to a boom 20L. The boom 20L extends in the front-rear direction. The boom 20L is attached to the front wing 14 and the rear wing 16. The boom 20L is provided on the left side of the center of gravity G. That is, the rotor 18FLa, the rotor 18FLb, the rotor 18RLa, and the rotor 18RLb are disposed on the left side of the center of gravity G.

The rotor 18FRa, the rotor 18FRb, the rotor 18RRa, and the rotor 18RRb are attached to a boom 20R. The boom 20R extends in the front-rear direction. The boom 20R is attached to the front wing 14 and the rear wing 16. The boom 20R is provided on the right side of the center of gravity G. That is, the rotor 18FRa, the rotor 18FRb, the rotor 18RRa, and the rotor 18RRb are disposed on the right side of the center of gravity G.

When the aircraft 10 is viewed from above, each of the rotor 18FLa, the rotor 18RLa, the rotor 18FRb, and the rotor 18RRb rotates counterclockwise. When the aircraft 10 is viewed from above, each of the rotor 18FRa, the rotor 18RRa, the rotor 18FLb, and the rotor 18RLb rotates clockwise.

A rotation shaft (not shown) of each of the VTOL rotors 18 extends in the up-down direction. The thrust of each of the VTOL rotors 18 is controlled by adjusting the rotational speed of the rotor and the pitch angle of the blades. Each of the VTOL rotors 18 is used during vertical take-off, during transition from vertical take-off to cruising, during transition from cruising to vertical landing, during vertical landing, during hovering, and the like. Further, each of the VTOL rotors 18 is used during attitude control. The rotation shaft of each of the VTOL rotors 18 may be angled (canted) a few degrees with respect to the up-down direction.

By controlling the thrust of each of the eight VTOL rotors 18, lift thrust is generated. The lift thrust refers to thrust in the vertical direction. The magnitude of the lift thrust is determined according to the sum of the thrusts of the eight VTOL rotors 18.

By controlling the thrust of each of the eight VTOL rotors 18, a roll moment is applied to the fuselage 12. The magnitude of the roll moment is determined according to the difference between the sum of the thrusts of the four VTOL rotors 18 disposed on the left side of the center of gravity G, and the sum of the thrusts of the four VTOL rotors 18 disposed on the right side of the center of gravity G.

The four VTOL rotors 18 disposed on the left side of the center of gravity G indicate the rotor 18FLa, the rotor 18FLb, the rotor 18RLa, and the rotor 18RLb. The four VTOL rotors 18 disposed on the right side of the center of gravity G indicate the rotor 18FRa, the rotor 18FRb, the rotor 18RRa, and the rotor 18RRb.

By controlling the thrust of each of the eight VTOL rotors 18, a pitch moment is applied to the fuselage 12. The magnitude of the pitch moment is determined according to the difference between the sum of the thrusts of the four VTOL rotors 18 disposed forward of the center of gravity G, and the sum of the thrusts of the four VTOL rotors 18 disposed rearward of the center of gravity G.

The four VTOL rotors 18 disposed forward of the center of gravity G indicate the rotor 18FLa, the rotor 18FLb, the rotor 18FRa, and the rotor 18FRb. The four VTOL rotors 18 disposed rearward of the center of gravity G indicate the rotor 18RLa, the rotor 18RLb, the rotor 18RRa, and the rotor 18RRb.

By controlling the counter torque in each of the eight VTOL rotors 18, a yaw moment is applied to the fuselage 12. The magnitude of the yaw moment is determined according to the difference between the sum of the counter torques of the four VTOL rotors 18 rotating counterclockwise, and the sum of the counter torques of the four VTOL rotors 18 rotating clockwise.

When the rotation shaft of each of the VTOL rotors 18 is angled (canted) a few degrees with respect to the up-down direction, thrust in the lateral direction of the fuselage 12 is generated by the VTOL rotors 18. In this case, the magnitude of the yaw moment is determined according to, in addition to the above-described difference between the sums of the counter torques, the difference between the moment generated by the thrust generated in the counterclockwise direction of the fuselage 12, and the moment generated by the thrust generated in the clockwise direction of the fuselage 12.

The four VTOL rotors 18 rotating counterclockwise indicate the rotor 18FLa, the rotor 18RLa, the rotor 18FRb, and the rotor 18RRb. The four VTOL rotors 18 rotating clockwise indicate the rotor 18FRa, the rotor 18RRa, the rotor 18FLb, and the rotor 18RLb.

The aircraft 10 includes two cruise rotors 22. The two cruise rotors 22 are a rotor 22L and a rotor 22R. Each cruise rotor 22 corresponds to a horizontal rotor of the present invention.

The rotor 22L and the rotor 22R are attached to a rear portion of the fuselage 12. The rotor 22L is disposed on the left side of a center line A of the fuselage 12. The rotor 22R is disposed on the right side of the center line A of the fuselage 12.

A rotation shaft (not shown) of each of the cruise rotors 22 extends in the front-rear direction. The thrust of each of the cruise rotors 22 is controlled by adjusting the rotational speed of the rotor and the pitch angle of the blades. Each of the cruise rotors 22 is used during transition from vertical take-off to cruising, during cruising, during transition from cruising to vertical landing, and the like. Further, each of the cruise rotors 22 is used during attitude control. The rotation shaft of each of the cruise rotors 22 may be angled (canted) a few degrees with respect to the front-rear direction.

By controlling the thrust of each of the two cruise rotors 22, cruise thrust is generated. The cruise thrust refers to thrust in the horizontal direction. The magnitude of the cruise thrust is determined according to the sum of the thrusts of the two cruise rotors 22.

By controlling the thrust of each of the two cruise rotors 22, a yaw moment is applied to the fuselage 12. The magnitude of the yaw moment is determined according to a difference between the magnitude of the thrust of the rotor 22L and the magnitude of the thrust of the rotor 22R.

[Configuration of Power Supply System]

Figure 2:
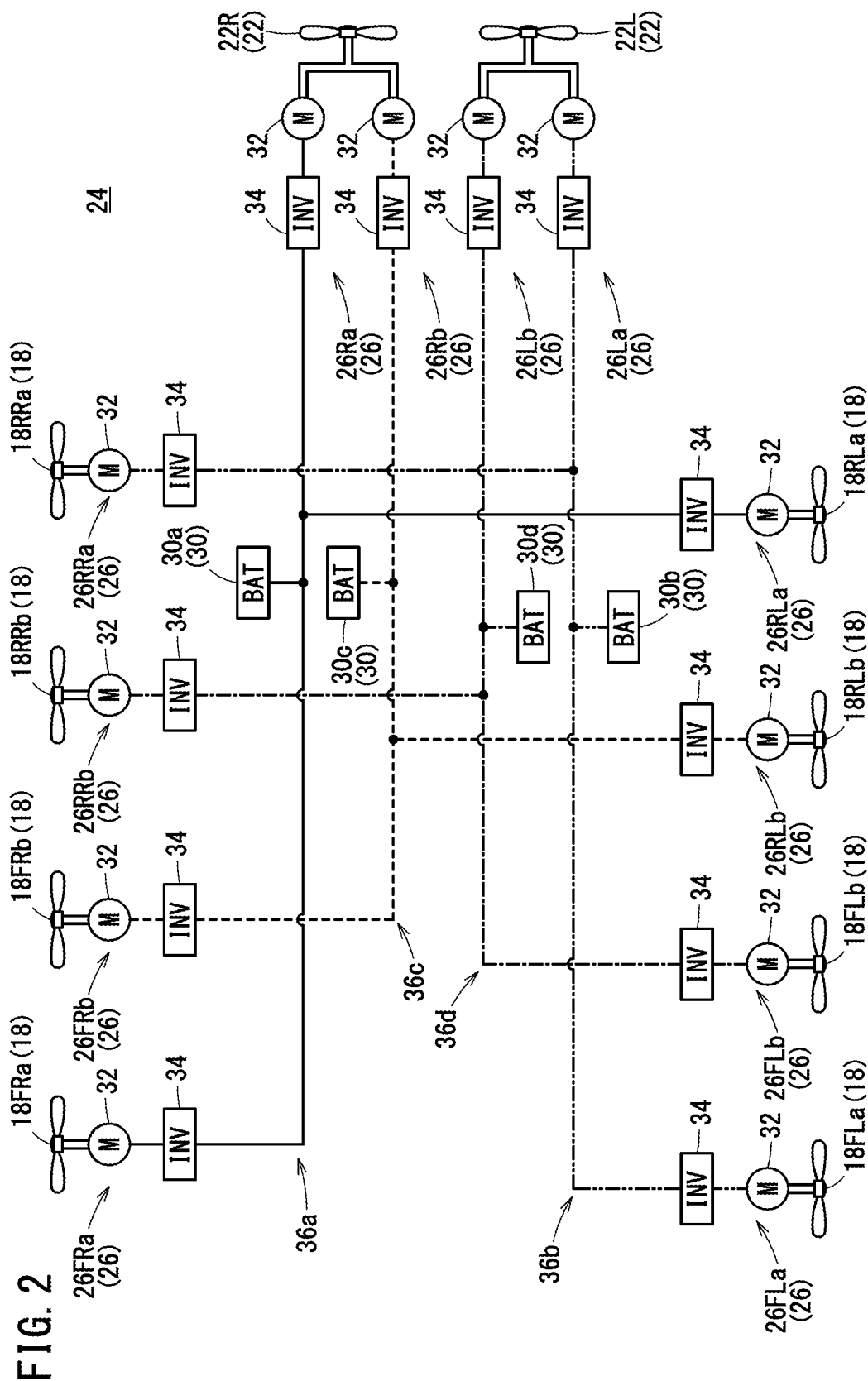
FIG. 2 is a diagram showing the configuration of a power supply system.
Figure 3:
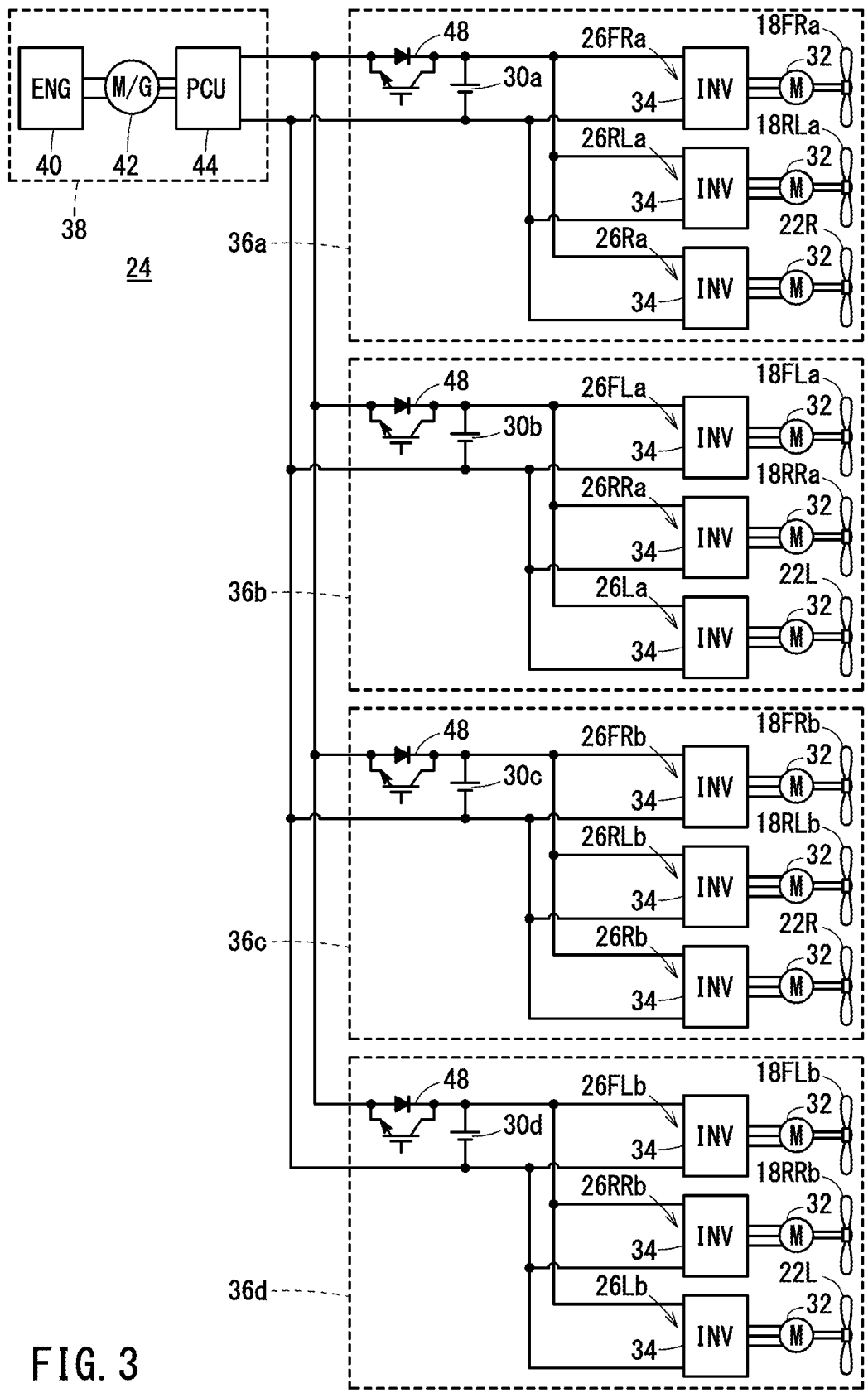
FIG. 3 is a diagram showing the configuration of the power supply system.

FIG. 2 is a diagram showing the configuration of a power supply system 24. FIG. 2 mainly shows a connection relationship between four batteries 30 and twelve electric motors 32. FIG. 3 is a diagram showing the configuration of the power supply system 24.

One drive unit 26 is provided for each VTOL rotor 18. A drive unit 26FLa is provided for the rotor 18FLa. A drive unit 26FLb is provided for the rotor 18FLb. A drive unit 26RLa is provided for the rotor 18RLa. A drive unit 26RLb is provided for the rotor 18RLb. A drive unit 26FRa is provided for the rotor 18FRa. A drive unit 26FRb is provided for the rotor 18FRb. A drive unit 26RRa is provided for the rotor 18RRa. A drive unit 26RRb is provided for the rotor 18RRb.

Two drive units 26 are provided for each cruise rotor 22. A drive unit 26La and a drive unit 26Lb are provided for the rotor 22L. A drive unit 26Ra and a drive unit 26Rb are provided for the rotor 22R.

One battery 30 is connected to three drive units 26. A battery 30a is connected to the drive unit 26FRa, the drive unit 26RLa, and the drive unit 26Ra. A battery 30b is connected to the drive unit 26FLa, the drive unit 26RRa, and the drive unit 26La. A battery 30c is connected to the drive unit 26FRb, the drive unit 26RLb, and the drive unit 26Rb. A battery 30d is connected to the drive unit 26FLb, the drive unit 26RRb, and the drive unit 26Lb.

Each drive unit 26 includes an electric motor 32 and an inverter 34. The electric motor 32 is a three phase motor. An output shaft (not shown) of the electric motor 32 is coupled to the rotation shaft of each VTOL rotor 18 or the rotation shaft of each cruise rotor 22. The inverter 34 converts the input DC power into three phase AC power and outputs the three phase AC power to the electric motor 32.

As shown in FIG. 3, three drive units 26 and one battery 30 constitute a drive module 36. The drive unit 26FRa, the drive unit 26RLa, the drive unit 26Ra, and the battery 30a constitute a drive module 36a. The drive unit 26FLa, the drive unit 26RRa, the drive unit 26La, and the battery 30b constitute a drive module 36b. The drive unit 26FRb, the drive unit 26RLb, the drive unit 26Rb, and the battery 30c constitute a drive module 36c. The drive unit 26FLb, the drive unit 26RRb, the drive unit 26Lb, and the battery 30d constitute a drive module 36d.

Each drive module 36 is connected to a power generation module 38. The power generation module 38 includes an engine 40, a motor generator 42, and a power control unit (hereinafter referred to as PCU) 44.

The engine 40 is a gas turbine engine. The engine 40 may be a reciprocating engine. The motor generator 42 functions as a three phase motor and also functions as a three phase generator. A rotation shaft (not shown) of the motor generator 42 is coupled to an output shaft (not shown) of the engine 40.

The PCU 44 includes an inverter and a converter. The PCU 44 converts the three phase AC power input from the motor generator 42 into DC power and outputs the DC power. Further, the PCU 44 converts the DC power input from each battery 30 into three phase AC power and outputs the three phase AC power to the motor generator 42.

As shown in FIG. 3, each drive module 36 includes a switch 48. Each switch 48 includes a switching element such as an IGBT and a diode. Each switch 48 always allows the supply of electric power from the power generation module 38 to the drive module 36. When each switch 48 is ON, it allows the supply of electric power from the drive module 36 to the power generation module 38.

When each switch 48 is ON, electric power is supplied from each battery 30 to the motor generator 42. As a result, the motor generator 42 is operated to start the engine 40. When the engine 40 is operating, the electric power generated by the motor generator 42 is supplied to each battery 30 and each electric motor 32. As a result, each battery 30 is charged. In addition, each electric motor 32 is operated.

FIGS. 2 and 3 show the outline of the power supply system 24. In the power supply system 24 shown in FIGS. 2 and 3, some members are omitted. The omitted members include, for example, electrical loads other than the electric motors 32, resistors, coils, capacitors, various sensors, fuses, relays, breakers, precharge circuits, DC-DC converters, and the like.

[Configuration of Rotor Control Device]

Figure 4:
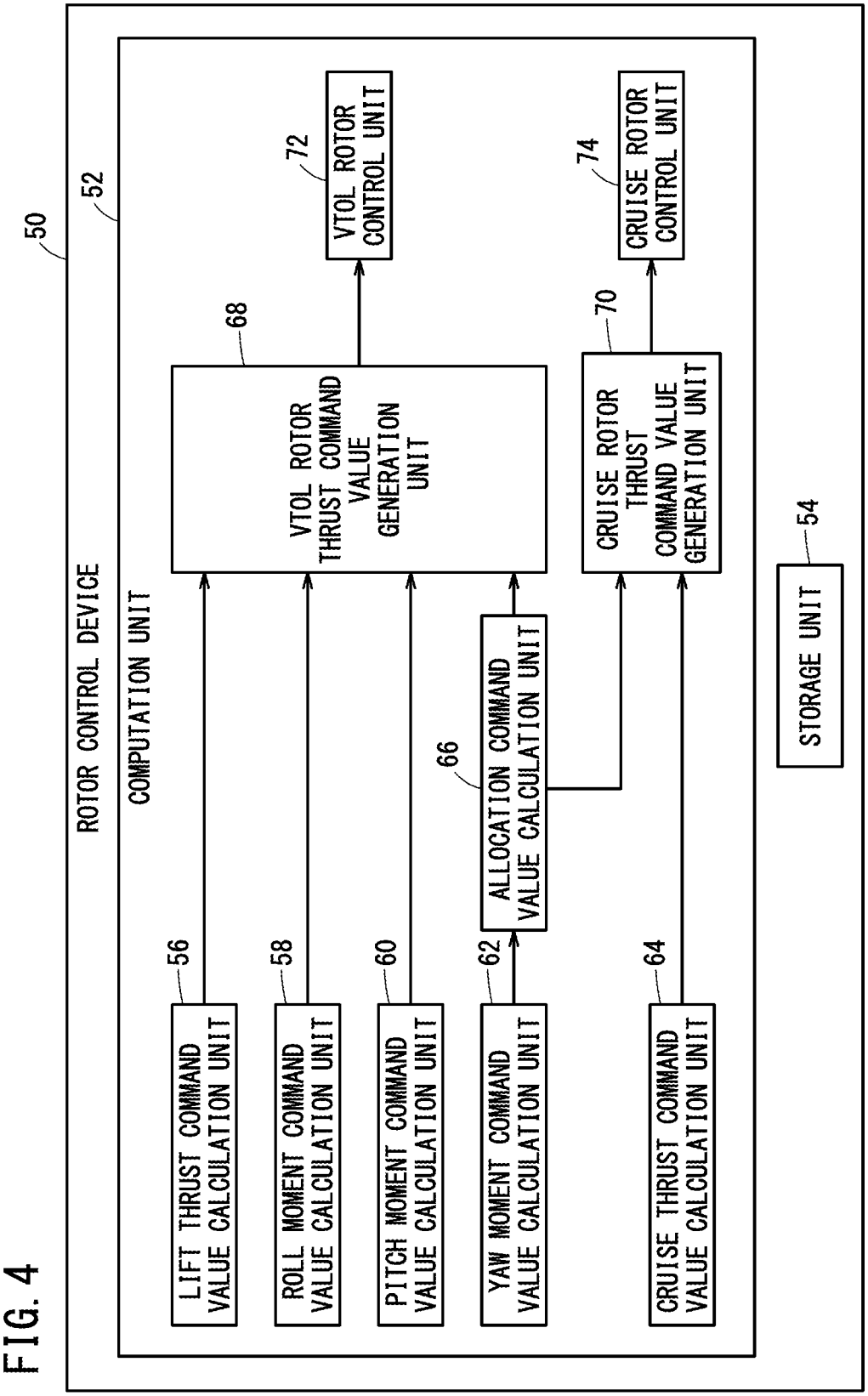
FIG. 4 is a control block diagram of a rotor control device.

FIG. 4 is a control block diagram of a rotor control device 50. The rotor control device 50 controls the thrust of each VTOL rotor 18 and the thrust of each cruise rotor 22. The rotor control device 50 corresponds to an attitude control device of the present invention. The rotor control device 50 includes a computation unit 52 and a storage unit 54.

The computation unit 52 is, for example, a processor such as a central processing unit (CPU) or a graphics processing unit (GPU). The computation unit 52 includes a lift thrust command value calculation unit 56, a roll moment command value calculation unit 58, a pitch moment command value calculation unit 60, a yaw moment command value calculation unit 62, a cruise thrust command value calculation unit 64, an allocation command value calculation unit 66, a VTOL rotor thrust command value generation unit 68, a cruise rotor thrust command value generation unit 70, a VTOL rotor control unit 72, and a cruise rotor control unit 74.

The lift thrust command value calculation unit 56, the roll moment command value calculation unit 58, the pitch moment command value calculation unit 60, the yaw moment command value calculation unit 62, the cruise thrust command value calculation unit 64, the allocation command value calculation unit 66, the VTOL rotor thrust command value generation unit 68, the cruise rotor thrust command value generation unit 70, the VTOL rotor control unit 72, and the cruise rotor control unit 74 are realized by the computation unit 52 executing programs stored in the storage unit 54.

At least part of the lift thrust command value calculation unit 56, the roll moment command value calculation unit 58, the pitch moment command value calculation unit 60, the yaw moment command value calculation unit 62, the cruise thrust command value calculation unit 64, the allocation command value calculation unit 66, the VTOL rotor thrust command value generation unit 68, the cruise rotor thrust command value generation unit 70, the VTOL rotor control unit 72, and the cruise rotor control unit 74 may be realized by an integrated circuit such as an application specific integrated circuit (ASIC) or a field-programmable gate array (FPGA).

At least part of the lift thrust command value calculation unit 56, the roll moment command value calculation unit 58, the pitch moment command value calculation unit 60, the yaw moment command value calculation unit 62, the cruise thrust command value calculation unit 64, the allocation command value calculation unit 66, the VTOL rotor thrust command value generation unit 68, the cruise rotor thrust command value generation unit 70, the VTOL rotor control unit 72, and the cruise rotor control unit 74 may be realized by an electronic circuit including a discrete device.

The storage unit 54 is configured by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage unit 54 may be included in the processor, the integrated circuit, or the like described above.

The lift thrust command value calculation unit 56 calculates a lift thrust command value. The lift thrust command value is determined in accordance with, for example, an operation amount of an operation input unit by the pilot. The operation input unit is, for example, a control stick, a pedal, a lever, or the like. The operation amount of the operation input unit and the lift thrust command value may not have a one to-one correspondence. The lift thrust command value may be variable with respect to the operation amount of the operation input unit in accordance with the operation range of the operation input unit, the operation speed of the operation input unit, the altitude of the aircraft 10, and the like. The altitude of the aircraft 10 is estimated based on, for example, a distance between the aircraft 10 and the ground detected by a ground distance meter (not shown). The altitude of the aircraft 10 is estimated based on, for example, signals received from a global navigation satellite system (GNSS).

When there is no operation input to the operation input unit by the pilot, the lift thrust command value may be automatically determined and hovering may be performed regardless of the operation amount of the operation input unit. Further, when the aircraft 10 is automatically controlled, the lift thrust command value may be automatically determined in accordance with a preset flight path, regardless of the operation amount of the operation input unit.

The roll moment command value calculation unit 58 calculates a roll moment command value. The roll moment command value is determined in accordance with the operation amount of the operation input unit by the pilot. The operation amount of the operation input unit and the roll moment command value may not have a one to-one correspondence. The roll moment command value may be variable with respect to the operation amount of the operation input unit in accordance with the operation range of the operation input unit, the operation speed of the operation input unit, the angular velocity of the fuselage 12, and the like. The angular velocity of the fuselage 12 is detected by, for example, a gyro sensor (not shown).

When there is no operation input to the operation input unit by the pilot, the roll moment command value may be automatically determined and hovering may be performed regardless of the operation amount of the operation input unit. Further, when the aircraft 10 is automatically controlled, the roll moment command value may be automatically determined in accordance with the preset flight path, regardless of the operation amount of the operation input unit.

The pitch moment command value calculation unit 60 calculates a pitch moment command value. The pitch moment command value is determined in accordance with, for example, the operation amount of the operation input unit by the pilot. The operation amount of the operation input unit and the pitch moment command value may not have a one to-one correspondence. The pitch moment command value may be variable with respect to the operation amount of the operation input unit in accordance with the operation range of the operation input unit, the operation speed of the operation input unit, the angular velocity of the fuselage 12, and the like.

When there is no operation input to the operation input unit by the pilot, the pitch moment command value may be automatically determined and hovering may be performed regardless of the operation amount of the operation input unit. Further, when the aircraft 10 is automatically controlled, the pitch moment command value may be automatically determined in accordance with the preset flight path, regardless of the operation amount of the operation input unit.

The yaw moment command value calculation unit 62 calculates a yaw moment command value. The yaw moment command value is determined in accordance with, for example, the operation amount of the operation input unit by the pilot. The operation amount of the operation input unit and the yaw moment command value may not have a one to-one correspondence. The yaw moment command value may be variable with respect to the operation amount of the operation input unit in accordance with the operation range of the operation input unit, the operation speed of the operation input unit, the angular velocity of the fuselage 12, and the like.

When there is no operation input to the operation input unit by the pilot, the yaw moment command value may be automatically determined and hovering may be performed regardless of the operation amount of the operation input unit. Further, when the aircraft 10 is automatically controlled, the yaw moment command value may be automatically determined in accordance with the preset flight path, regardless of the operation amount of the operation input unit.

The cruise thrust command value calculation unit 64 calculates a cruise thrust command value. The cruise thrust command value is determined in accordance with, for example, the operation amount of the operation input unit by the pilot. The operation amount of the operation input unit and the cruise thrust command value may not have a one to-one correspondence. The cruise thrust command value may be variable with respect to the operation amount of the operation input unit in accordance with the operation range of the operation input unit, the operation speed of the operation input unit, the airspeed of the aircraft 10, and the like. The airspeed of the aircraft 10 is detected by, for example, an airspeed sensor (not shown).

When there is no operation input to the operation input unit by the pilot, the cruise thrust command value may be automatically determined and the aircraft 10 may fly at a constant speed. Further, when the aircraft 10 is automatically controlled, the cruise thrust command value may be automatically determined in accordance with the preset flight path, regardless of the operation amount of the operation input unit.

The allocation command value calculation unit 66 calculates a first allocation command value and a second allocation command value. The first allocation command value is a portion of the yaw moment command value and indicates a command value for generating the yaw moment by the eight VTOL rotors 18. The second allocation command value is a portion of the yaw moment command value and indicates a command value for generating the yaw moment by the two cruise rotors 22.

Figure 5:
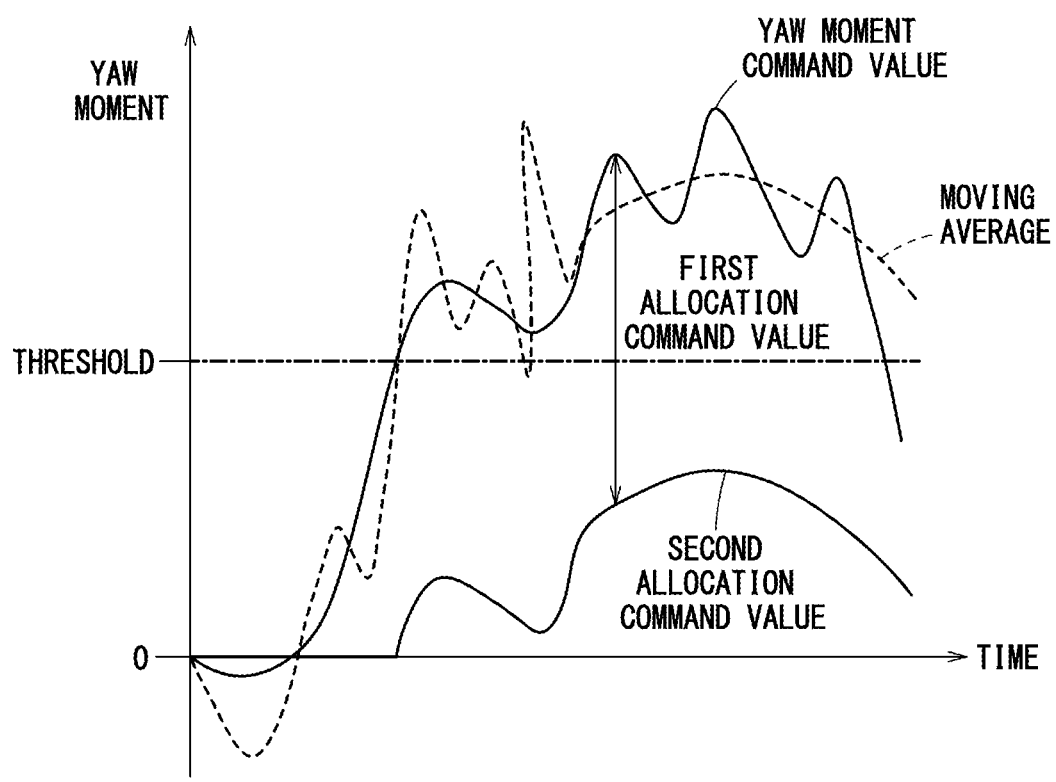
FIG. 5 is a graph showing an example of temporal changes of a yaw moment command value, a moving average of the yaw moment command value, and a second allocation command value.

FIG. 5 is a graph showing an example of temporal changes of the yaw moment command value, a moving average of the yaw moment command value, and the second allocation command value.

The allocation command value calculation unit 66 sets, as the first allocation command value, a difference between the yaw moment command value and the second allocation command value. When the moving average of the yaw moment command value is less than a threshold, the allocation command value calculation unit 66 sets the magnitude of the second allocation command value to 0. When the moving average of the yaw moment command value is equal to or greater than the threshold, the allocation command value calculation unit 66 sets the magnitude of the second allocation command value to a value greater than 0. Specifically, the allocation command value calculation unit 66 sets, as the second allocation command value, a difference between the moving average of the yaw moment command value and the threshold.

Thus, the steady component of the yaw moment command value is set as the second allocation command value, and the non-steady component of the yaw moment command value is set as the first allocation command value. Specifically, a component of the yaw moment command value that has a large variation is allocated as a command value for the VTOL rotors 18, and a component of the yaw moment command value that has a small variation is allocated as a command value for the cruise rotors 22.

The threshold is a value determined in advance. The allocation command value calculation unit 66 may variably set the threshold. For example, when one or some of the eight VTOL rotors 18 fail, the allocation command value calculation unit 66 may decrease the threshold. For example, the allocation command value calculation unit 66 may set the threshold according to the number of failed VTOL rotors 18 among the eight VTOL rotors 18. The allocation command value calculation unit 66 may set the threshold variably in accordance with the airspeed of the aircraft 10. For example, when the airspeed is equal to or higher than a predetermined speed, the threshold may be decreased as the airspeed increases.

The VTOL rotor thrust command value generation unit 68 generates a thrust command value for each VTOL rotor 18. The VTOL rotor thrust command value generation unit 68 generates a thrust command value based on the lift thrust command value, the roll moment command value, the pitch moment command value, and the first allocation command value.

The cruise rotor thrust command value generation unit 70 generates a thrust command value for each cruise rotor 22. The cruise rotor thrust command value generation unit 70 generates a thrust command value based on the cruise thrust command value and the second allocation command value.

The VTOL rotor control unit 72 controls the thrust of each VTOL rotor 18 based on the thrust command value for each VTOL rotor 18. The VTOL rotor control unit 72 corresponds to a processor of the present invention.

The cruise rotor control unit 74 controls the thrust of each cruise rotor 22 based on the thrust command value for each cruise rotor 22. The cruise rotor control unit 74 corresponds to a processor of the present invention.

[Rotor Control]

FIG. 6 is a flowchart showing a flow of a rotor control process performed by the rotor control device 50. The rotor control process is repeatedly executed at a predetermined cycle while the aircraft 10 is in flight.

In step S1, the allocation command value calculation unit 66 calculates the first allocation command value and the second allocation command value. Thereafter, the process proceeds to step S2.

In step S2, the VTOL rotor thrust command value generation unit 68 generates a thrust command value for each VTOL rotor 18. The VTOL rotor thrust command value generation unit 68 generates a thrust command value based on the lift thrust command value, the roll moment command value, the pitch moment command value, and the first allocation command value. Thereafter, the process proceeds to step S3.

In step S3, the cruise rotor thrust command value generation unit 70 generates a thrust command value for each cruise rotor 22. The cruise rotor thrust command value generation unit 70 generates a thrust command value based on the cruise thrust. Thereafter, the process proceeds to step S4.

In step S4, the VTOL rotor control unit 72 controls the thrust of each VTOL rotor 18 based on the thrust command value for each VTOL rotor 18. Thereafter, the process proceeds to step S5.

In step S5, the cruise rotor control unit 74 controls the thrust of each cruise rotor 22 based on the thrust command value for each cruise rotor 22. Thereafter, the rotor control is ended.

Advantageous Effects

In the aircraft 10 of the present embodiment, the rotor control device 50 causes a roll moment, a pitch moment, and a yaw moment to act on the fuselage 12 by generating a difference in thrust between the eight VTOL rotors 18. Thus, the rotor control device 50 performs attitude control for stabilizing the attitude of the fuselage 12. Even when attitude control of the fuselage 12 is performed, it is necessary to ensure lift thrust generated by the eight VTOL rotors 18 in order to prevent sudden descent of the aircraft 10. The ratio of the thrust generated by each VTOL rotor 18 to ensure the lift thrust, to the upper limit of the thrust that can be generated by each VTOL rotor 18, is high. Therefore, there may be a case where it is not possible to generate a sufficient difference in thrust between the plurality of VTOL rotors 18 while ensuring the lift thrust.

Therefore, the rotor control device 50 of the present embodiment generates the yaw moment by the eight VTOL rotors 18 and generates the yaw moment by the two cruise rotors 22. As a result, the rotor control device 50 of the present embodiment can reduce the yaw moment generated by the eight VTOL rotors 18 with respect to the yaw moment command value calculated by the yaw moment command value calculation unit 62. Therefore, the thrust of each VTOL rotor 18 allocated for control of the roll moment and the pitch moment can be increased. As a result, it is possible to increase the difference in thrust between the VTOL rotors 18. Thus, the attitude of the fuselage 12 can be stabilized in the roll direction and the pitch direction at an early stage. As a result, while stabilizing the attitude of the fuselage 12 in the roll direction and the pitch direction at an early stage, the rotor control device 50 of the present embodiment can stabilize the attitude of the fuselage 12 also in the yaw direction at an early stage.

When the magnitude of the cruise thrust command value is relatively large, it is possible to generate a sufficient difference in thrust between the two cruise rotors 22 in order to generate the yaw moment while generating the cruise thrust corresponding to the cruise thrust command value. However, when the magnitude of the cruise thrust command value is relatively small, if an attempt is made to generate a sufficient difference in thrust between the two cruise rotors 22, the cruise thrust becomes excessive with respect to the cruise thrust command value.

When the cruise thrust becomes excessive with respect to the cruise thrust command value, the following two problems arise.

The first problem is a decrease in energy efficiency. When the yaw moment is generated by the eight VTOL rotors 18, the output power of the electric motor 32 that drives each VTOL rotor 18 is used as energy that causes the yaw moment to act on the fuselage 12 and causes the lift thrust to act on the fuselage 12. For example, during hovering, it is necessary to constantly cause the lift thrust to act on the fuselage 12. Therefore, the output power of the electric motor 32 that drives each VTOL rotor 18 is effectively consumed as energy that causes the lift thrust to act on the fuselage 12.

On the other hand, when the yaw moment is generated by the two cruise rotors 22, the output power of the electric motor 32 that drives each cruise rotor 22 is used as energy that causes the yaw moment to act on the fuselage 12 and causes the cruise thrust to act on the fuselage 12. For example, there is a case where little cruise thrust is required even during flight, such as when the aircraft 10 is hovering. Nevertheless, the output power of the electric motor 32 that drives each cruise rotor 22 is wastefully consumed as energy that causes the cruise thrust to act on the fuselage 12.

The second problem is that the attitude of the fuselage 12 becomes unstable in the pitch direction. When the position at which each cruise rotor 22 is attached to the fuselage 12 is located above or below the center of gravity G (FIG. 1), a pitch moment is generated in the fuselage 12 as each cruise rotor 22 generates thrust. As the cruise thrust increases, the magnitude of the pitch moment increases, whereby the attitude of the fuselage 12 becomes unstable.

Therefore, in the rotor control device 50 of the present embodiment, the allocation command value calculation unit 66 sets the magnitude of the second allocation command value to 0 when the moving average of the yaw moment command value is less than the threshold. The allocation command value calculation unit 66 sets the first allocation command value as the yaw moment command value. In this case, the yaw moment is generated by the eight VTOL rotors 18. The two cruise rotors 22 are not used to generate the yaw moment.

When the moving average of the yaw moment command value is less than the threshold, the required yaw moment is relatively small. Therefore, with only eight VTOL rotors 18, it is possible to generate a sufficiently large yaw moment while generating a roll moment and a pitch moment. The two cruise rotors 22 are not used to generate the yaw moment. Consequently, the rotor control device 50 of the present embodiment can prevent the output power of the electric motor 32 that drives each cruise rotor 22 from becoming excessive with respect to the cruise thrust command value calculated by the cruise thrust command value calculation unit 64. As a result, deterioration in energy efficiency of the aircraft 10 can be suppressed. Further, it is possible to prevent the fuselage 12 from becoming unstable.

In the rotor control device 50 of the present embodiment, when the moving average of the yaw moment command value is equal to or greater than the threshold, the allocation command value calculation unit 66 sets the magnitude of the second allocation command value to a value greater than 0. The allocation command value calculation unit 66 sets, as the first allocation command value, the difference between the yaw moment command value and the second allocation command value. In this case, the yaw moment is generated by the eight VTOL rotors 18 and by the two cruise rotors 22.

When the moving average of the yaw moment command value is equal to or greater than the threshold, the required yaw moment is relatively large. Therefore, there is a case where the eight VTOL rotors 18 alone cannot generate a sufficiently large yaw moment while generating a roll moment and a pitch moment. Therefore, the yaw moment is generated by the eight VTOL rotors 18 and by the two cruise rotors 22. As a result, the rotor control device 50 of the present embodiment can cause a sufficiently large yaw moment to act on the fuselage 12.

The response speed of a change in the yaw moment generated by the two cruise rotors 22 is lower than the response speed of a change in the yaw moment generated by the eight VTOL rotors 18. Therefore, there is a case where the yaw moment generated by the two cruise rotors 22 cannot follow the variation of the yaw moment command value.

Therefore, in the rotor control device 50 of the present embodiment, when the moving average of the yaw moment command value is equal to or greater than the threshold, the allocation command value calculation unit 66 sets, as the second allocation command value, the difference between the moving average of the yaw moment command value and the threshold. The allocation command value calculation unit 66 sets, as the first allocation command value, the difference between the yaw moment command value and the second allocation command value. In this case, the steady component of the yaw moment command value is set as the second allocation command value, and the non-steady component of the yaw moment command value is set as the first allocation command value. Specifically, a component of the yaw moment command value that has a large variation is allocated as a command value for the VTOL rotors 18, and a component of the yaw moment command value that has a small variation is allocated as a command value for the cruise rotors 22.

Thus, the yaw moment generated by the two cruise rotors 22 can follow the variation of the second allocation command value. The yaw moment generated by the eight VTOL rotors 18 follows the variation of the yaw moment command value. As a result, the rotor control device 50 of the present embodiment can cause the yaw moment applied to the fuselage 12 to follow the variation of the yaw moment command value while ensuring the magnitude of the yaw moment applied to the fuselage 12.

In addition, in the rotor control device 50 of the present embodiment, the allocation command value calculation unit 66 decreases the threshold when one or some of the eight VTOL rotors 18 fail. Thus, the yaw moment is generated by the cruise rotors 22 at an early stage. Therefore, even when one or some of the VTOL rotors 18 fail, the rotor control device 50 of the present embodiment can stabilize the attitude of the fuselage 12 in the roll direction and the pitch direction at an early stage.

Further, in the rotor control device 50 of the present embodiment, the allocation command value calculation unit 66 may decrease the threshold as the airspeed of the aircraft 10 increases. Thus, the yaw moment is generated by the cruise rotors 22 at an early stage.

Note that the present invention is not limited to the above disclosure, and various modifications are possible without departing from the essence and gist of the present invention.

In the rotor control device 50 of the first embodiment, when the moving average of the yaw moment command value is equal to or greater than the threshold, the allocation command value calculation unit 66 sets, as the second allocation command value, the difference between the moving average of the yaw moment command value and the threshold.

On the other hand, the allocation command value calculation unit 66 may compare the low frequency component of the yaw moment command value with a threshold. When the low frequency component of the yaw moment command value is equal to or greater than the threshold, the allocation command value calculation unit 66 may set, as the second allocation command value, a difference between the low frequency component of the yaw moment command value and the threshold.

Further, the allocation command value calculation unit 66 may compare the yaw moment command value with a threshold. When the yaw moment command value is equal to or greater than the threshold, the allocation command value calculation unit 66 may change the second allocation command value stepwise by a predetermined change amount in accordance with a difference between the yaw moment command value and the threshold. Further, when the yaw moment command value is equal to or greater than the threshold, the allocation command value calculation unit 66 may set, as the second allocation command value, a difference between the yaw moment command value and the threshold.

Invention Obtained from Embodiments

The invention that can be grasped from the above embodiments will be described below.

According to the present invention, provided is the attitude control device (50) that performs attitude control of the fuselage (12) of the aircraft (10) including the plurality of vertical rotors (18) each configured to generate thrust in a vertical direction and the plurality of horizontal rotors (22) each configured to generate thrust in a horizontal direction, the attitude control device (50) including: the yaw moment command value calculation unit (62) configured to calculate the command value of the yaw moment to be applied to the fuselage; the allocation command value calculation unit (66) configured to calculate the first allocation command value and the second allocation command value in accordance with the command value of the yaw moment; the vertical rotor control unit (72) configured to control each of the vertical rotors based on the first allocation command value; and the horizontal rotor control unit (74) configured to control each of the horizontal rotors based on the second allocation command value, wherein the allocation command value calculation unit: sets, as the first allocation command value, the difference between the command value of the yaw moment and the second allocation command value; sets the magnitude of the second allocation command value to 0 when the command value of the yaw moment is less than the threshold; and sets the magnitude of the second allocation command value to a value greater than 0 when the command value of the yaw moment is equal to or greater than the threshold. According to this feature, it is possible to prevent the cruise thrust from becoming excessive with respect to the cruise thrust command value while stabilizing the attitude of the fuselage also in the yaw direction at an early stage.

In the above-described attitude control device, the allocation command value calculation unit may set the magnitude of the second allocation command value to 0 when the command value of the yaw moment is less than the threshold, and may set the second allocation command value to a value corresponding to the low frequency component of the command value of the yaw moment when the command value of the yaw moment is equal to or greater than the threshold. According to this feature, it is possible to cause the yaw moment applied to the fuselage to follow the variation of the command value while ensuring the magnitude of the yaw moment applied to the fuselage.

In the above-described attitude control device, the allocation command value calculation unit may make the threshold variable. According to this feature, the attitude of the fuselage can be stabilized in the roll direction and the pitch direction at an early stage.

In the above-described attitude control device, the allocation command value calculation unit may make the threshold variable according to the number of the vertical rotors that have failed. According to this feature, the attitude of the fuselage can be stabilized in the roll direction and the pitch direction at an early stage.

The invention claimed is:

1. An attitude control device that performs attitude control of a fuselage of an aircraft including a plurality of vertical rotors each configured to generate thrust in a vertical direction and a plurality of horizontal rotors each configured to generate thrust in a horizontal direction,
wherein
one or more of the plurality of vertical rotors rotate in a first direction,
another one or more of the plurality of vertical rotors rotate in a second direction that is an opposite direction of the first direction,
one or more of the plurality of horizontal rotors are arranged on one side of a center line that extends in a front-rear direction of the fuselage and passes through a center of gravity of the fuselage,
another one or more of the plurality of horizontal rotors are arranged on another side of the center line,
the attitude control device comprises one or more processors that execute computer-executable instructions stored in a memory,
the one or more processors execute the computer-executable instructions to cause the attitude control device to:
calculate a command value of a yaw moment to be applied to the fuselage;
set a magnitude of a second allocation command value to 0 when the command value of the yaw moment is less than a threshold;
set the magnitude of the second allocation command value to a value greater than 0 when the command value of the yaw moment is equal to or greater than the threshold;
set, as a first allocation command value, a difference between the command value of the yaw moment and the second allocation command value;
control each of the vertical rotors based on the first allocation command value and generate yaw moment at the fuselage by creating a difference between counter torque of the one or more of the plurality of vertical rotors rotating in the first direction and counter torque of the another one or more of the plurality of vertical rotors rotating in the second direction; and
control each of the horizontal rotors based on the second allocation command value and generate yaw moment at the fuselage by creating a difference between thrust of the one or more of the plurality of horizontal rotors arranged on one side of the center line and thrust of the another one or more of the plurality of horizontal rotors arranged on another side of the center line.

2. The attitude control device according to claim 1, wherein
the one or more processors cause the attitude control device to:
set the magnitude of the second allocation command value to 0 when the command value of the yaw moment is less than the threshold; and set the second allocation command value to a value corresponding to a low frequency component that is a frequency component equal to or less than a predetermined frequency out of frequency components of the command value of the yaw moment when the command value of the yaw moment is equal to or greater than the threshold.

3. The attitude control device according to claim 1, wherein
the one or more processors cause the attitude control device to make the threshold variable.

4. The attitude control device according to claim 3, wherein
the one or more processors cause the attitude control device to make the threshold variable according to a number of the vertical rotors that have failed.

5. A control method for an attitude control device that performs attitude control of a fuselage of an aircraft including a plurality of vertical rotors each configured to generate thrust in a vertical direction and a plurality of horizontal rotors each configured to generate thrust in a horizontal direction,
wherein
one or more of the plurality of vertical rotors rotate in a first direction,
another one or more of the plurality of vertical rotors rotate in a second direction that is an opposite direction of the first direction,
one or more of the plurality of horizontal rotors are arranged on one side of a center line that extends in a front-rear direction of the fuselage and passes through a center of gravity of the fuselage,
another one or more of the plurality of horizontal rotors are arranged on another side of the center line,
the control method comprising:
calculating a command value of a yaw moment to be applied to the fuselage;
setting a magnitude of the second allocation command value to 0 when the command value of the yaw moment is less than a threshold;
setting the magnitude of the second allocation command value to a value greater than 0 when the command value of the yaw moment is equal to or greater than the threshold;
setting, as a first allocation command value, a difference between the command value of the yaw moment and the second allocation command value;
controlling each of the vertical rotors based on the first allocation command value and generating yaw moment at the fuselage by creating a difference between counter torque of the one or more of the plurality of vertical rotors rotating in the first direction and counter torque of the another one or more of the plurality of vertical rotors rotating in the second direction; and
controlling each of the horizontal rotors based on the second allocation command value and generating yaw moment at the fuselage by creating a difference between thrust of the one or more of the plurality of horizontal rotors arranged on one side of the center line and thrust of the another one or more of the plurality of horizontal rotors arranged on another side of the center line.

6. The attitude control device according to claim 1, wherein both of the one or more of the plurality of vertical rotors configured to rotate in the first direction and the another one or more of the plurality of vertical rotors configured to rotate in the second direction are arranged on both sides of the center line.

7. The attitude control device according to claim 3, wherein in a case where an airspeed is equal to or higher than a predetermined speed, the threshold decreases as the airspeed increases.

8. The attitude control device according to claim 1, wherein a yaw moment generated by the plurality of vertical rotors and a yaw moment generated by the plurality of horizontal rotors are directed to same direction.

\* \* \* \* \*